May 5, 1964 W. HAGEN 3,131,936
AUTOMATIC RECORD PLAYER
Filed May 23, 1961 7 Sheets-Sheet 1
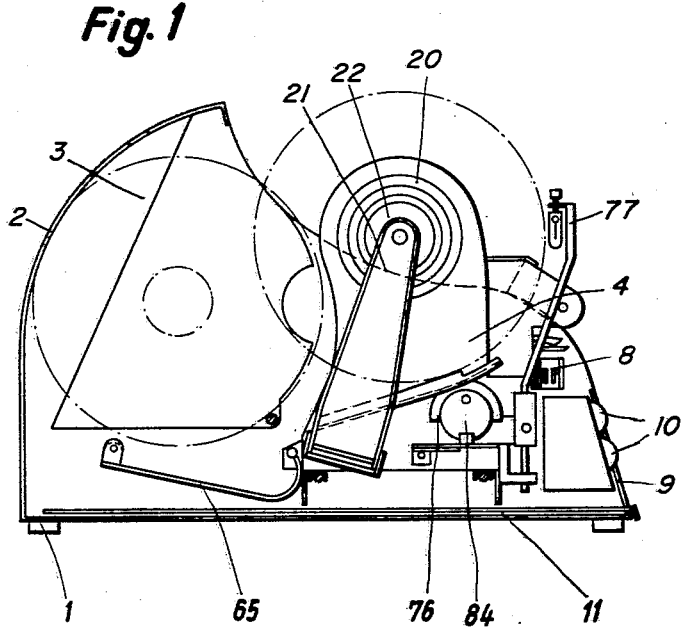
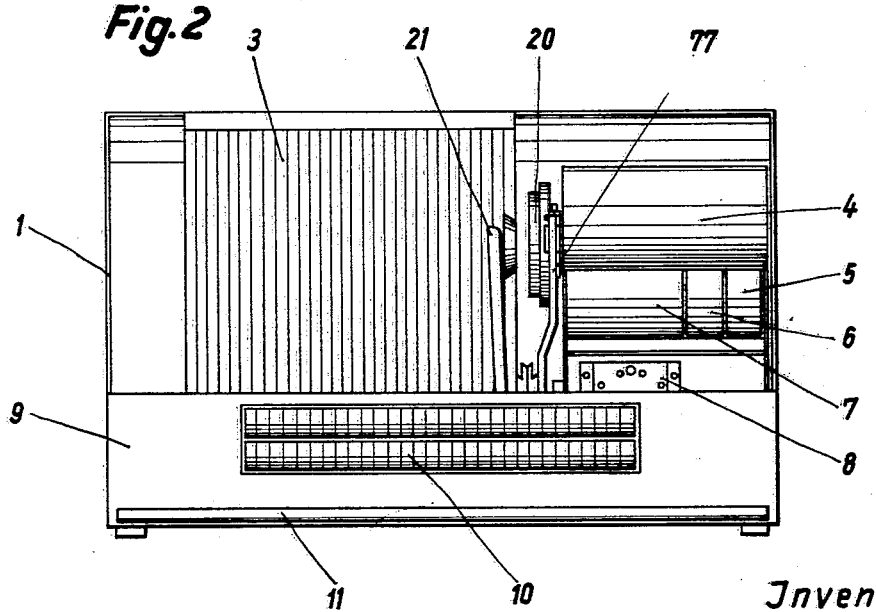
Inventor:
Werner Hagen
by Mestern, Ross & Mestern Inventor:
Werner Hagen

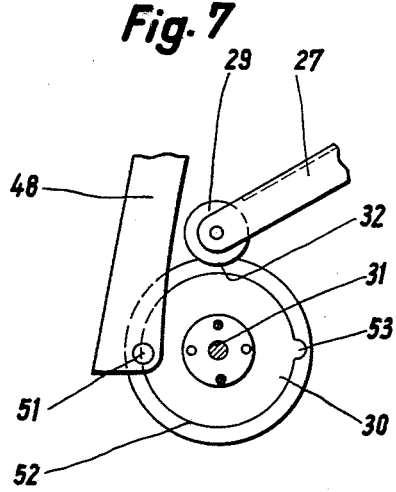
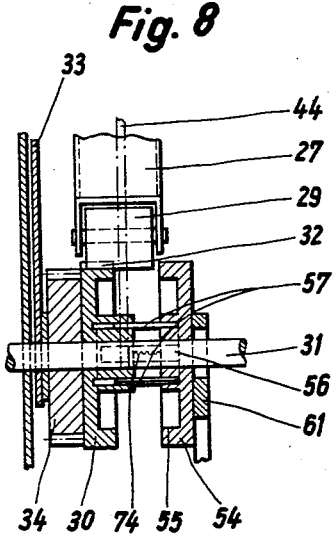
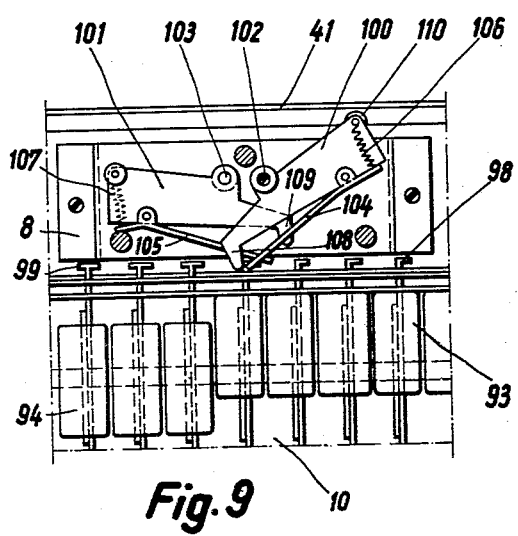
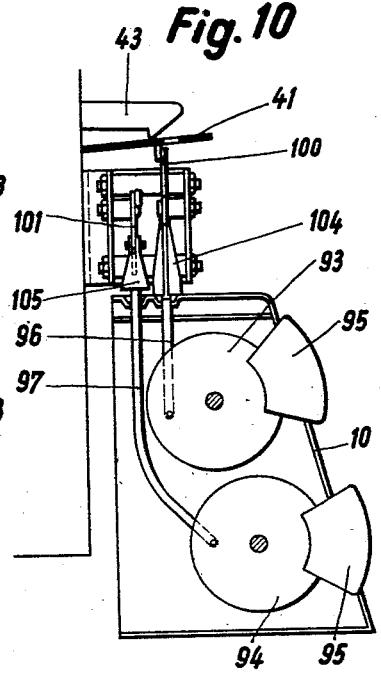

Inventor:
Werner Hagen

May 5, 1964 W. HAGEN 3,131,936
AUTOMATIC RECORD PLAYER

Filed May 23, 1961 7 Sheets-Sheet 7

Inventor:
Werner Hagen
by Western, Ross & Western

United States Patent Office 3,131,936
Patented May 5, 1964

3,131,936
AUTOMATIC RECORD PLAYER
Werner Hagen, 16 Dunker Strasse, Homberg
(Lower Rhine), Germany
Filed May 23, 1961, Ser. No. 112,119
Claims priority, application Belgium May 27, 1960
16 Claims. (Cl. 274—10)

The present invention relates to an automatic gramophone record playing device which is suitable for domestic purposes and which can be used instead of known semi-automatic multiple record players for example in cabinet form or as a portable device. Hereinafter in this specification, the noun "record" means a gramophone record.

Known multiple record players generally have a capacity of ten records and will hereinafter be referred to as ten-record players. These ten record players are suitbale for domestic use and enable the records, which are stacked one above the other on a stacking spindle, to be played consecutively. In these known devices, in order to arrange a programme of music of different records, it is necessary to select the desired records from a stock of available records and to stack them on the stacking spindle in the desired sequence and with the desired record sides appropriately arranged in the playing sequence in order to obtain the playing of the desired programme of music.

Furthermore, automatic record playing devices which have become known as "Juke Boxes" or "Music Boxes" are used in the trade in diverse forms. In devices of this kind upon the insertion of an appropriate sum of money, it is possible to choose any record and any side of a record and therefore any sequence of musical items from a stock or store of records. For this purpose there is provided a selector device controlled by a number of keys, each one of which is allocated to one record side, so that the selection of the record side to be played takes place upon operating the corresponding key of the selector device. The reproduction of the record takes place by means of a playing mechanism which removes the record from the store, lays it upon the turntable, controls the movement of the pick-up arm necessary for playing and, after the playing has finished, returns the record into the store.

Embodiments are known in which the playing mechanism is fixed: in these devices the record store is generally formed as a circle and can be rotated with regard to the fixed playing mechanism, the rotary movement of the store being controlled by the selector device in such a way that the selected records are played in the desired sequence.

Conversely, devices are known in which the record store is fixed, for example horizontally: in this case the playing mechanism can be longitudinally moved along a slot in front of the record store, the shifting movement being controlled by means of the selector device to play the selected records in the desired sequence.

These record playing devices used in the trade are very complicated and expensive to construct, and in order to carry out the necessary control and selection functions they all use electrical or electrically operated elements, for example relays, magnetic clutches, magnetic switches, spring contacts and the like.

It is an object of the invention to provide an automatic record playing device suitable for domestic use which is comparable, both as regards the space necessary for its installation and its cost of production, to the ten-record players previously known for the same purpose. Such a device has hitherto not been known. The direct transfer of the constructional principles known in the "Juke Boxes" used in the trade to devices for domestic use is out of the question; the knowledge and experience gained in the construction of these "Juke Boxes" cannot be used in the construction of devices for domestic use owing to the large space required for them and particularly the price. It is therefore for example impossible, by using known electrically operating switching and control elements, to provide a selector device which can be built into the same space as that occupied by a ten-record player. In addition a low production cost as desired by the applicant cannot be achieved by the straight transfer of the methods of construction known for "Juke Boxes," since the price thereof is thirty to forty times that of known ten-recorded players. Even if the available selection is curtailed by omitting certain parts which are superfluous for a domestic device, a production cost can never be reached which is at the same level as that of conventional ten-record players.

The above-mentioned desiderata is achieved according to the invention by causing the entire control and switching functions of the selector device and the carriage to be carried out exclusively by mechanically operating parts, eliminating electrical or electrically influenced elements, with the exception of the driving means. The choice of purely mechanically operating parts permits the necessary compact method of construction which allows one to have a device which required about the same installation space as a ten-record player and which can therefore be built without any difficulty into a conventional cabinet and may even be marketed in the form of a portable device. The choice of mechanical constructional parts furthermore allows the production of automatic record playing devices at a price which approximates to that of ten-record players.

According to a feature of the invention, the carriage has three push-buttons, one of which serves to switch on the driving means and therefore prepares the device for playing, a second to interrupt or to continue the process of playing and a third for the repeated playing of a selected record side. By means of the arrangement of these keys it is possible to interrupt a continuous programme of music at any place and, after a pause, once more to set it in motion; it is also possible to hear a selected piece of music any number of times.

In one embodiment of the invention, the playing carriage of the device has a driving spindle which can rotate in both directions in order to play one or the other of the sides of the record; the driving spindle itself, as desired, drives a displacement device for displacing the carriage, or a control shaft, whereby the latter stops the carriage means of a half-rotation, takes the record to be played to a gripping device and brings about the laying on of the pick-up arm, while upon a further half turn it brings about the return of the played record to the record store and the further movement of the slider. The carriage also has a releasing device which, upon the engagement of the feeling device with an operated selector-pin, couples the spindle to the control shaft and thereby actuates the playing process.

The feeler device preferably comprises two opposed tippable rockers each of which has a feeler which, upon the shifting of the carriage, samples the row of selector pins allocated to it and, upon meeting an actuated selector pin, tips the rocker about its axis of rotation, whereby the end of the rocker operates the release plate and thereby actuates the playing process of the selected record. Each rocker may have a projecting lug on its forward end, which, upon the meeting of a feeler with an operated selector pin, puts the latter back into its position of rest by its tipping movement.

In a further development of the invention the driving spindle is provided with a pinion, with which, as desired, the driving wheel of the carriage shifting device or the driving wheel of a transmission comes into engagement, said transmission being arranged on an arm which is swingable about the control shaft.

The driving wheel of the carriage shifting device is advantageously arranged at the end of a bell crank lever the other end of which lies upon the circumference of a control disc, provided with a recess, via a roller, whereby the drive wheel of the shifting device comes into engagement with the pinion only when the roller rests in the recess in the control disc.

The releasing device may consist of a release plate hinged on the carriage housing, which plate is swingable by means of the feeler members of the selector device or by a member operated by the pick-up arm after the playing is completed, and, furthermore, of a release lever which can engage with a pawl in a recess in the plate, whereby the release lever, upon being released by means of the release plate by means of spring action, forms a coupling between the drive spindle and the control shaft and thereby initiates the playing process. The repeater key arranged on the carriage also operates directly upon the release plate and thus brings about the repetition of the piece of music in question.

In a further development of the invention an adjusting arm is provided on the carriage, which arm, upon the release of the release lever, is swung and applies the swingable arm carrying the drive of the control shaft to the pinion of the drive spindle. A cam disc is arranged on the control shaft which disc restores the release lever to its initial position. The cam disc has a cylindrical inner flange provided with two recesses displaced with regard to each other, on which flange a finger on the adjusting arm is supported and holds the swinging arm in its position of engagement with the driving pinion until the finger engages in one of the recesses and the adjusting arm causes the swinging lever to go back into its position of rest, corresponding to the stationary state of the control shaft, by means of spring action. Furthermore a displaceable disc is provided on the control shaft, which disc is adjustable in the direction towards the cam disc and which, at its circumference, supports the end of the operating lever for the reversal of the carriage movement and thereby prevents its engaging in the depression in the control disc, which displaceable disc has an inner flange as a support for a finger of the adjusting arm and thereby prevents its engagement in one of the recesses of the inner flange of the cam disc whereby the playing process is repeated, due to the carriage remaining in its playing position. The displaceable disc serving for the repetition of the playing process is held in its position next to the control disc by means of a rest device which is automatically released upon the completion of the repeated playing process.

In a further development of the invention the record to be played is taken to the gripping device by means of a gripping member which is operated by means of a cam disc arranged on the control shaft; the record in question is pressed against the turntable by means of a gripping arm carrying a hub cone via a further cam disc.

The pick-up arm arranged on the carriage is secured so as to swing upon a rod which is displaced in the end positions of the carriage by means of stops located on the housing; the pick-up arm is held with its ends between two cheeks rotatably fixed to the housing of the slider which cheeks hold the pick-up arm in its position of rest when they are in a position close to each other, brought about by means of the strength of a spring, and, in a separated position, brought about by a cam disc fixed to the control shaft, release the record so that it can be applied against the plate. A switch, causing the reversal of the direction of rotation of the driving motor located in the carriage, is operated by the movable rod carrying the pick-up arm.

The driving means may comprise two oppositely-rotatable synchronous motors arranged on a common shaft, the motor which at the moment is being energised, taking the other motor along with it so that the latter acts as a counterweight in order to steady the running.

By means of the switching and control elements constructed according to the invention, the device is purely mechanically operated only the driving means being electrically operated. This construction and co-operation of the individual parts allows the device to be constructed very compactly and at reasonable cost while retaining certain operations so that it can indeed be regarded as a true improvement over ordinary ten-record players.

According to another feature of the invention, the selector device of keys are arranged in a row in a frame constructed as a sliding carriage which is movable by means of a lever in such a way that all the buttons operated for the selection of a programme are restored to their initial positions by moving the sliding carriage by means of the lever. It is possible by this means to cancel an entire programme set up on the selector device by operating one single lever. To this end the selector device push buttons have push rods whose forward ends pass through slots in a wall and have a projecting lug which, upon movement of the frame, abuts the wall, and pushes the keys, which are in their selected position, back into their position of rest.

In order to prevent the transfer of shocks imparted to the drive shaft by means of the worm transmission, to the record, the turntable is made very heavy to give it a fly wheel effect and is constructed so that its hub is loose on the drive shaft and is rotated by means of a flexible coupling member which grips the drive shaft and the turntable and evens out the shocks of said shaft. In this way, the record can be played without mechanical disturbance or interference. This coupling member may consist of a sprung rod which is arranged radially to the turntable and is fixed at one end in a transverse bore in the drive shaft and at its other end on the circumference of the turntable. In order to limit the relative movement between turntable and drive shaft brought about by means of the coupling member, a transversely directed catch may be fixed on the forward end of the drive shaft, said catch occupying a slot in the turntable, the width of said slot being greater than the width of the catch but less than its length. In this way, any excessive load on the coupling member is prevented.

In order that the invention may be more clearly understood, reference will now be made to the accompanying drawings which show one embodiment thereof by way of example and in which:

FIGURE 1 shows a side view of the device according to the invention,

FIGURE 2 shows a front view thereof,

FIGURE 7 shows a side view of a control disc,

FIGURE 8 shows part of the control shaft,

FIGURE 9 shows part of the selector device with a feeler,

FIGURE 10 is a side view of the parts of FIGURE 9,

Figure 3:
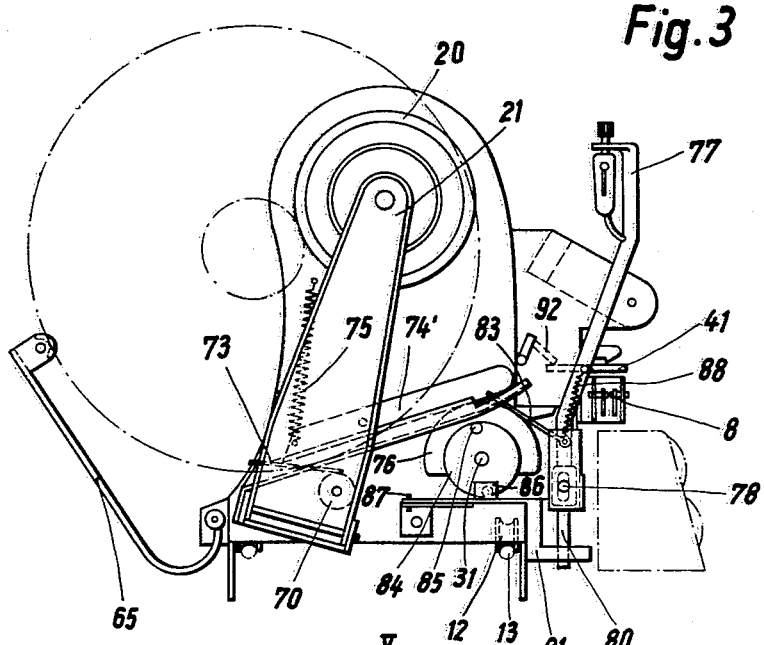
FIGURE 3 shows a side view of the playing carriage.

Referring to the drawings, FIGURES 1 and 2 show a device according to the invention as a whole. At the rear portion 2 of a housing 1 is arranged a record store 3 which is divided into individual compartments. At the front of the device is located a movable carriage 4 upon which are arranged a key 5 for setting the device in motion, a key 6 to interrupt a programme being played and a key 7 for repeating individual pieces of music. The carriage also carries a feeler device 8. In the forward wall 9 of the housing is arranged a selector device which consists of a keyboard 10 which in the embodiment comprises 60 keys for the individual sides of 30 records. On the lower side of the housing 1 is arranged a removable plate 11 upon which the records contained in the store 3 are written down in their sequence and with their record sides in agreement with the numerals on the keyboard.

The constructional formation of the carriage 4 is shown in detail in FIGURES 3 to 6. At its base the carriage 4 has a plurality of rollers 12 which run on rails 13 fastened on the housing, thus enabling the carriage to be displaced transversely to the record store 3. The drive of the device is effected by an assembly consisting of two contra-rotating synchronous motors 14, 15, operative to rotate a driving shaft 16 in one direction or the other. On the shaft 16 is fixed a worm 17 which is preferably made of plastic in order to ensure quiet running. The worm 17 drives a drive shaft 18, upon which is fixed a driving pinion 19; at the end of the shaft 18 is fixed the turntable 20 which is preferably made of rubber and which co-operates with a pivotable gripping arm 21, which carries a centralizing member 22 for the record to be gripped.

The movement of the carriage 4 is effected via a toothed wheel 23 which can be brought into engagement with the driving pinion 19. A pulley 24 is connected to the toothed wheel 23, which pulley drives a cord 25 which actuates the movement of the carriage, said cord running over a guide roller 26 and being fixed at its end to the opposite side walls of the housing. The toothed wheel 23 is mounted on a bell crank lever 27 which is pivotable about an axis 28; the other end of the lever 27 carries a roller 29 which is applied to a control disc 30 which is fixe don a control shaft 31. On its circumference the control disc 30 has a recess 32; when the roller 29 enters the recess 32, the toothed wheel 23 is then coupled to the driving pinion 19 by means of a corresponding rotation of the lever 27, and the carriage 4 is displaced by means of the cord 25. If, upon the rotation of the control shaft 31 and the disc 30, the roller comes out of the recess 32, then the toothed wheel 23 comes out of engagement with the drive pinion 19 and thereby stops the carriage 4.

The drive of the control shaft 31 takes place via an arm 33 arranged to swing thereon. On the shaft 31 is fixed a toothed wheel 34 which is in engagement with a transmission drive 35, 36, 37, 38 which is arranged on the arm 33. The toothed wheel 38 can, upon an appropriate movement of the arm 33, be brought into engagement with the driving pinion 19, in order to rotate the control shaft 31. The end of the arm 33 is subjected to the operation of a tipping lever 39 which at one end lies on the arm 33 and at the other end is subjected to the action of a spring 40 in such a way that the arm 33 is pushed under spring pressure into the switched-off position. The swinging of the arm 33 into the engagement position with the driving pinion 19 takes place via a release device which consists of a swingable release plate 41, in which is provided a recess 42 for engagement of a pawl 43; the pawl 43 is fixed to a release lever 44 which is swingable about an axis 45. The release lever 44 is subjected to the action of a spring 46; it has a pin 47 which takes with it an adjustment arm 48 which is also rotatable about the axis 45. The adjustment arm 48 has a lug 49 which takes the swinging lever 33 with it and thereby brings the toothed wheel 38 into engagement with the pinion 19. The release lever 44 is taken back into its position of rest by means of a cam disc 50 fixed on the control shaft 31. The adjustment arm 48 has at its lower end a peg 51 which projects on both sides and which is guided in a turned shoulder 52 of the control disc 30.

The shoulder has two opposite recesses 53 which the peg 51 can enter. If the peg 51 lies on the shoulder 52 then the swinging arm 33 is held in its engaged position by means of the adjustment arm 48 and the control shaft 31 is rotated. If the peg 51 enters the recess 53 then the tipping lever 39 uncouples the toothed wheel 38 from the pinion 19 under the action of its spring 40 and upon the swinging of the arm 33 and the control shaft 31 is stopped.

Figure 5:
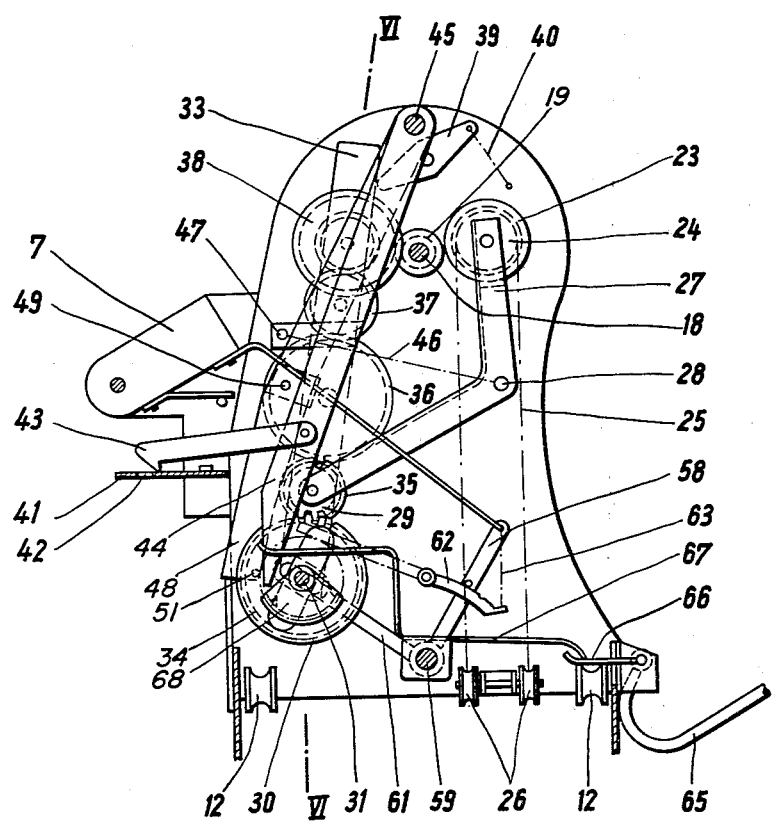
FIGURE 5 shows a section along the line V—V in FIGURE 4.

In order to repeat the playing of a record, referring to FIGURE 5 the repeater key 7 is pressed and a lever 58 is swung about its axis 59. Upon this swinging movement the lever 58 shifts a disc 54 near the control disc 30 over the oblique surface 60 of its casing by means of an arm 61. The disc 54 is constructed similarly to the control disc 30 but with the difference that it has no recess on its upper surface. Upon pressing the key 7, the disc 54, which is axially movable with regard to the control disk 30 by means of connector pins 57, is pushed beneath the roller 29 of the bell crank lever 27 so that the latter does not rest in the recess of the control disc 30 and can switch on the driving device of the carriage 4. The disc 54 has a turned shoulder 55 which is provided with a recess 56 into which the finger 51 of the adjustment arm 48 can rest when the repeated playing is finished. Upon operating the key 7, the lever 58 enters the rest lever which is subjected to the action of the spring 53 and holds the lever 58 in its inserted position until it is lifted out by means of a lug 64 fixed on the control shaft 31 so that the key 7 can go back into its position of rest. Thus under the action of the spring 74, the disc 54 returns into the position of rest shown in FIGURE 8.

Figure 6:
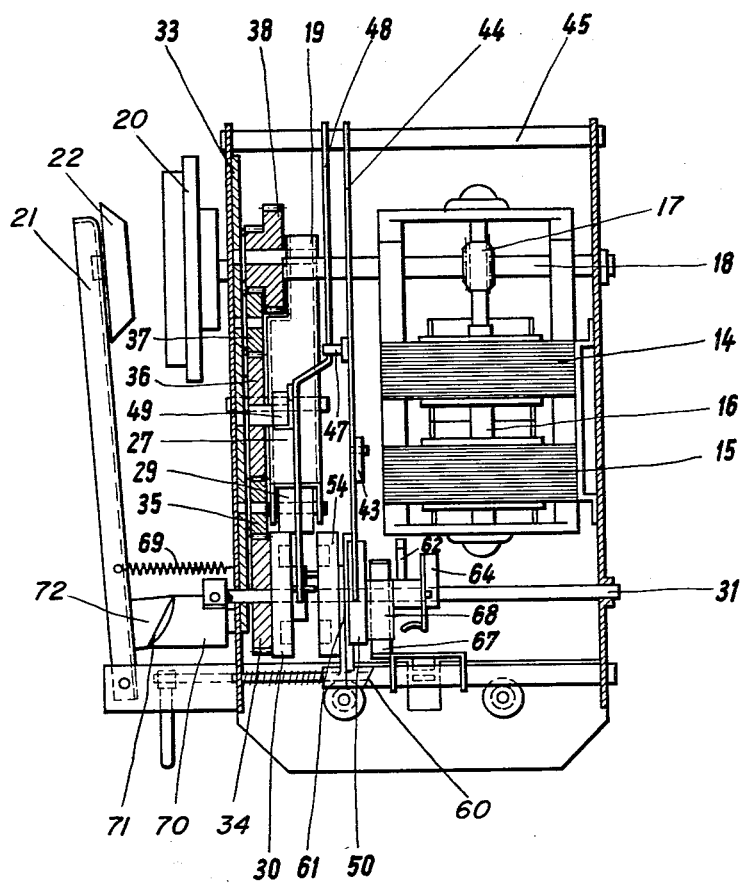
FIGURE 6 shows a section along the line VI—VI in FIGURE 5.

The record is taken to the turntable 20 by means of a gripping device 65 which has a bent-down arm 66 which a lever 67 lies which is rotatable about the axis 59 and is controlled by a cam disc 68 of the control shaft 61 FIGURE 5). The record taken to the turntable 20 is pressed down by means of the gripping arm 21 under the effect of the spring 69 and is centralized by means of the centralizing member 22 located on the arm 21. The swinging movement of the gripping arm is carried out by means of the pin 70 which, at its oblique portion 71, lies on a pin 72 attached to the arm 21 (FIGURE 6). On the pin 70 is fixed a tangentially directed arm 73 which is moved by means of an arm subjected to the action of the spring 75 which arm in its turn lies on a cam disc 76 of the control shaft 31.

Figure 4:
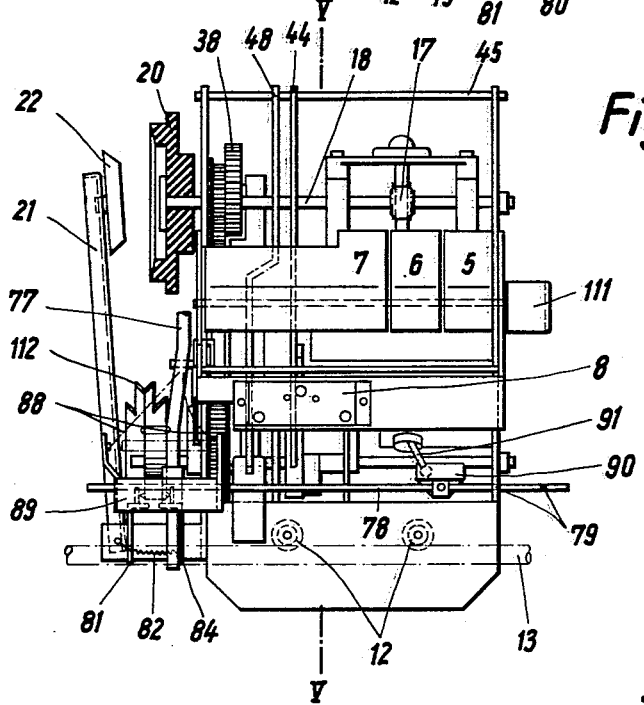
FIGURE 4 shows a front view of the parts of FIGURE 3.

Referring to FIGURES 3 and 4, the pick-up arm 77 is fixed on an adjustable rod 78, which is provided with stops 79, and carries a double-sided pick-up head. The end 80 of the pick-up arm 77 lies between two cheeks 81 which are pressed together by means of a spring 82. Depending upon the actual position of the rod 78, the pick-up arm 77 is held against the right hand or the left hand cheek 81, i.e. in its position of rest. Apart from this, a spring 83 fixed on the pick-up arm 77, which spring lies upon the cam disc 76, presses it outwards as shown in FIGURE 3. The cheeks 81 are spread apart about the point of rotation 87 by means of the cams 85 located on a disc 84 of the shaft 31 whenever the cams 85 come into engagement with the projections 86 on the cheeks 81 so that the pick-up arm 77 is released and, under the action of the springs 88 bearing against it, which springs are fixed to a fixed bracket 89, can lie on the turntable. At the same time the spring 83, upon further rotation of the cam disc 76, releases the pick-up arm 77 in the radial direction so that the record may be played. In this case the cam disc 76 and the disc 84 are located in a position which is rotated by about 180° with regard to the position shown in FIGURE 3. The rod 78 has a projection 90 which, upon the movement of the rod 78 into another end position, switches on the other synchronous motor and whereby the direction of rotation is reversed.

When the pick-up arm 77 reaches the final groove in the record, it operates the lever 92, shown in FIGURE 3, which operates the release plate 41. The interrupter key 6 also operates directly upon the release plate 41.

Upon the beginning of playing, the actuation i.e. the swinging of the release plate 41, takes place by means of the feeler members of the feeler device 8.

The keyboard 10 consists of two rows of keys 93, 94 lying one beneath the other, of which one row is allocated to one side of the records and the other row to the other side of the records. The keys are constructed as rotary elements and have operating members 95 upon the operation of which the keys 93, 94 are rotated and hereby the stop pins 96, 97 are pushed upwards as may be seen in FIGURE 10. The stop pins 96, 97 are provided at their ends with downwardly bent portions 98, 99 which in turn are directed towards each other. The downwardly bent portions of the two rows of keys 93, 94 point in opposite directions as may be seen in FIGURE 9. The feeler device 8 has two rockers 100, 101 which are directed towards each other and are relatively displaced corresponding to the distance between the rows of keys 93, 94. The rockers may be swung about the axis 102, 103. To the undersides of the rockers are hinged feelers 104, 105, which are held with their points directed downwards under the action of their springs 106, 107. The rockers 100, 101 are provided at their forward ends with lugs 108, 109. When the carriage 4 is moved from its initial position, as in FIGURE 2, towards the left, the rockers 100 run their feelers 104 over the stop pins 96 allocated to them. If one of the stop pins has been projected upwards by the operation of the key 93, then the feeler 104 comes against the appropriate stop 98 and rotates the rocker 100 downwards about its axis 102 whereby the lug 108 returns the stop 98 into its position of rest. At the same time the roller 110 presses against the release plate 41 and raises the latter whereby the pawl 43 and therewith the release lever 44 are released and the control shaft 31 is rotated. The feelers 105 of the rocker 101, now pass over any projecting stop pins 97 without rotating the rocker 101. These feelers 105 only come into action upon the return travel of the carriage 4 when they come against the stops 98 and operate in the same way as the rocker 100. The feelers 104, 105 have such a width that they slide on the housing of the selector device 10 and come into positive and operative contact only with those stops 98, 99 which are in fact projecting.

The device according to the invention operates as follows:

In the initial position, the carriage 4 is in the position shown in FIGURE 2. By operating the appropriate keys 95, the programme to be played is selected according to the programme sequence given on the table 11. The device is switched on by operating the key 5 whereby one of the motors 14, 15 moves the carriage 4 to the left. The key 5 is held mechanically and at the same time an end stop 111 (FIGURE 4) is pushed outwards. The pick-up arm rod 78 is in its left end position and stops the pick-up arm 77 on the left hand cheek 81. The roller 29 lies in the recess 32 of the control disc 30 and couples the toothed wheel 23 to the pinion 19 of the drive shaft 18, so that the carriage 4 is displaced. The pawl 43 of the release lever 44 is inserted into the recess 42 of the release plate 41 by means of which the toothed wheel 38 is held out of engagement with the pinion 19 so that the control shaft 31 is stationary, since the tipping lever 39, under the effect of its spring 40, holds the swinging arm 33 in the swung out position. This position of the swinging arm 33 is made possible because the finger 51 of the adjustment arm 48 is engaged in a recess 53 of the control disc 30. The record gripping device 65 is in its swung out position since its operating arm 67 is out of engagement with that cam of the cam disc 68 which is directed downwards. The gripping arm 21 is swung down from the turntable 20 since the lever 73 of the allocated cam disc 76 is held against the strength of the spring 75. Apart from this the spring 83 for the pick-up arm 77 lies on the cam disc 76 and presses the arm away from the turntable. The cheeks 81 are drawn together by means of their spring 82 so that the pick-up arm 77 is held against one of the cheeks 81.

When the carriage 4, which is moved to the left by this adjustment of its actuating members, together with the rocker 100 of its feeler device 8, said rocker being directed in the direction of travel, comes against a projecting stop 98 of the selector device 10, then the rocker 100 is swung by means of the feeler 104 about the axis 102 whereby the lug 108 pushes the projecting stop 87 back into its position of rest and the end of the rocker 110 raises the release plate 41. The pawl 43 is released and the release lever 44 swings to the right under the action of its spring 46 (FIGURE 5). The pin 47 takes with it the adjustment arm 48, the stop 49 of which swings the swinging arm 33 towards the right, and thereby brings the driving toothed wheel 38 of the control shaft 31 into engagement with the driving pinion 19 of the drive shaft 18 so that the control shaft begins to rotate. Upon the beginning of this rotation the roller 29 of the bell crank lever 27 is lifted from the recess 32 of the control disc 30 whereby the toothed wheel 23 comes out of engagement with the pinion 19 so that the carriage stops. Upon swinging the adjustment arm 48, the finger 51 is lifted out of the recess 53 in the control disc 30. During a half revolution the control shaft 31 brings about the actuation of the swinging arm 65, the gripping arm 21 and the pick-up arm 27, in order to play the record. When the pick-up arm 77 is placed upon the record the control shaft 31 is stopped and upon the entry of the pick-up arm 77 into the final groove, the control shaft 31 is once more rotated and during the following half-revolution brings about the return of the pick-up arm 77, the gripping arm 21 and the record gripping device 65 into the position of rest. This takes place in the following way:

The cam disc 50 returns the release lever 44 into its initial position in which the pawl 43 engages in the recess 42 of the release plate 41; the adjuster arm 44 and therewith also the swinging arm 33 remains in the operative position since the finger 51 is lying on the shoulder 52 of the control disc 30 and thereby holds the toothed wheel 38 in engagement with the pinion 19. The lever 67 of the record gripping device 65 is now applied to the cam disc 68 by means of which the gripping device 65 is raised and the selected record is taken to the turntable 20 and is inscribed into the guide groove 112 (FIGURE 4); the cam disc 76 now raises the lever 74 by means of which the gripping arm 21 is moved against the turntable 20 and with its centring member 22 lifts the record away from the groove 112 and the gripping device 65 and presses it against the turntable 20, by means of which it is taken along. The spring 83 of the pick-up arm 77 now no longer lies on the cam disc 76 so that the pick-up arm 77 is released in the radial direction: at the same time the cams 85 of the disc 84 come between the lugs 86 of the cheeks 81 and spread these apart against the action of the spring 82 about the point of rotation 87 whereby the pick-up arm 77 is released in the lateral direction and is applied under the action of one of the springs 88 to the record by means so that the playing of the record begins. At this moment the finger 51 of the adjustment arm 48 enters the other recess 53 of the control disc 30 whereby the arm 48 and the swinging arm 33 are swung so that the toothed wheel 38 comes out of engagement with the driving pinion 19 and the control shaft 31 is stopped while the drive shaft 18 runs on and the record revolves. The pick-up arm 77 is guided over the grooves of the record; when it reaches the final groove the release plate 41 is raised by means of the pick-up arm via the lever 92 and the release lever 44 is freed, which lever once more couples the toothed wheel 38 to the drive pinion 19 by means of swinging the arm 33, so that the control shaft is once more set in rotation. Upon the subsequent second half-revolution of the control shaft 31 similar processes are repeated in the reverse sequence whereby the record is returned to the record store 3 by means of the record gripping device 65, the pick-up arm 77 is returned to its halted position of rest and at the same time the gripping arm 21 is swung away from the turntable 20. Upon completion of this half-revolution, the finger 51 of the adjustment arm 48 enters one of the recesses 30 of the control disc, by means of which the swinging arm 33 takes the toothed wheel 38 out of engagement with the driving pinion 19 and the control shaft 31 is stopped. In this way, the roller 29 of the bell crank lever 27 enters the recess 32 in the circumference of the control disc 30, whereby the toothed wheel 23 is coupled to the driving pinion 19 and the carriage 4 is carried further until once more a rocker 100 abuts a projecting stop pin 98, whereupon the above-described cycle is repeated. If it is desired to repeat the playing of any record the key 7 is pressed during the playing. Then the disc 54 is axially moved against the action of the spring 75 towards the control disc and at its circumference grips beneath the roller 29 of the bell crank lever 27 so that this roller cannot grip in the recess 32 of the control disc 30 and the drive of the carriage 4 remains switched off. At the same time the right hand side of pin 51 of the adjustment arm 48 engages the inner shoulder 55 of the axially displaced disc 54 and is held firmly in this position so that it cannot enter the recess 53 of the disc 30; thus, the adjustment arm 48 cannot couple the toothed wheel 38 with the driving pinion 19 so that only the driving shaft 18 continues to run, while the control shaft 31 is held still. In this way the previously played record can once more be played. After the playing has finished the repeater key 7 returns into its initial position and therefore the disc 54 also goes back into its position of rest so that the carriage 4 is moved further. If the carriage 4 has reached its left hand end position, as in FIGURE 2, then the rod 78 comes against a left hand stop and is moved into the right hand end position: the pick-up arm 77 is then applied to the right hand cheek 81 and is under the action of the left hand spring 88, as shown in FIGURE 4. At the same time the stop 90 of the rod 78 has reversed the switch 91, by means of which one of the synchronous motors is switched off and the contra-rotating synchronous motor is switched on; by means of this the driving shaft 18 is rotated in the opposite direction and moves the carriage 4 from left to right. If upon this movement the rocker 101 abuts a projecting stop 99 (FIGURE 9) then the same cycle as previously described is initiated and the other side of the appropriate record is played. When the carriage 4 reaches its right hand end position then the rod 78 is pushed to the left by the reversal of the switch 91. At the same time the stop 111 is pressed in and thereby the switching-on key 5 is returned in to its position of rest, whereby the driving motor is then switched off. The carriage 4 is once more set in motion by once more operating the key 5.

Figure 11:
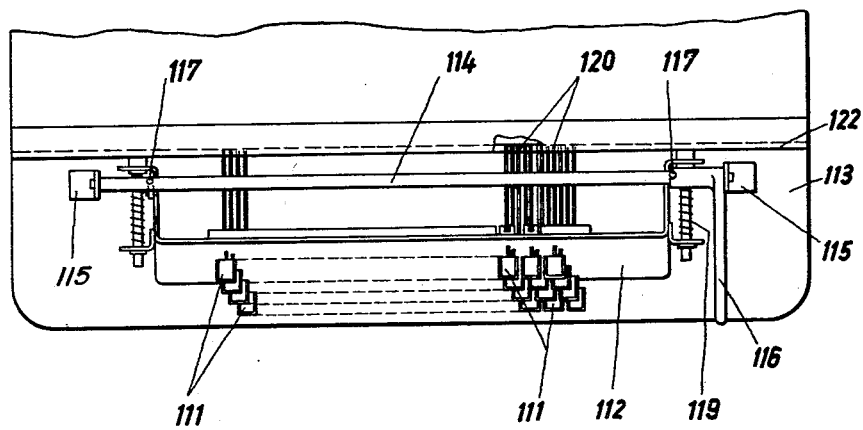
FIGURE 11 shows a plan of a keyboard.
Figure 12:
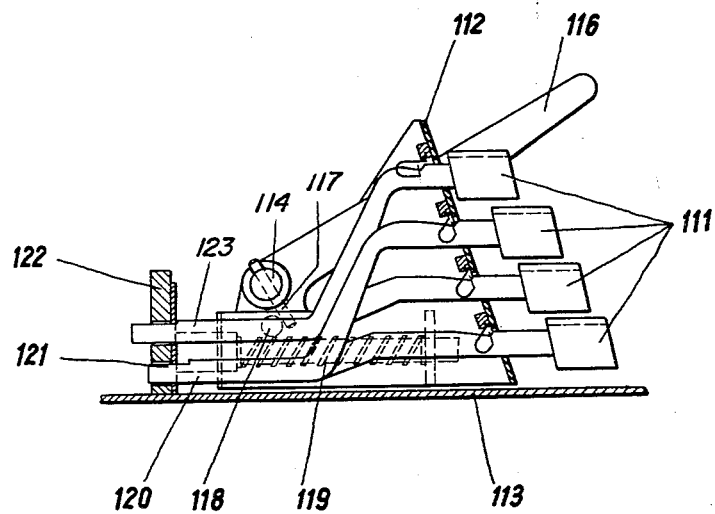
FIGURE 12 shows a side view of the arrangement of FIGURE 11.

FIGURES 11 and 12 show a particularly advantageous embodiment of the selector keyboard. The keys 111 are formed as push buttons and are arranged in a frame 119, which is arranged so as to be adjustable with regard to the bottom 113 of the chassis. To this end the frame 112 containing the keys 111 is formed as a sliding carriage and can be moved against the action of springs 119. The displacement takes place by means of a lever 116 which is fixed to a shaft 114 which is arranged in bearing brackets fixed to the bottom 113. Upon rotating the lever 116 the shaft 114 is rotated. The shaft 114 at both ends carries transversely directed pins 117 which lie against the stop bolts 118 of the frame 112 and displace it with regard to the bottom 113, as shown in FIGURE 12. Each individual key 111 has a push-rod 120 which passes through a slit in a wall standing vertically on the bottom 113; at its forward end each push-rod 120 has a lug 121 which, upon the displacement of the frame 112 by means of the lever 116, bears against the wall 122. The push rod 123 is located, according to FIGURE 2, in the selector position; upon displacing the frame 112 by means of the lever 116 the appropriate key 111 is returned to its position of rest by means of the lug 121 abutting the wall 122.

Figure 13:
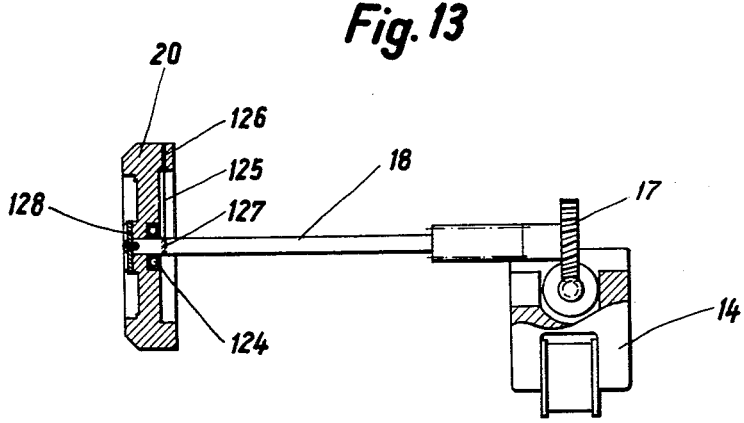
FIGURE 13 shows a side view of the turntable and the driving shaft and worm drive, the turntable being in section.
Figure 14:
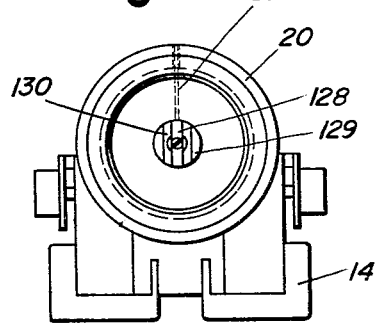
FIGURE 14 shows a front view of the arrangement of FIGURE 13.

FIGURES 13 and 14 show an advantageous arrangement of the turntable 20 which is driven by the motor 14 by means of the drive shaft 18 via the worm drive 17. The turntable 20 is carried so as to move freely via a ball bearing 124 on the forward end of the drive shaft 18. The drive of the turntable 20 is effected via a sprung rod 125 which at one end is carried in a bore 127 of the drive shaft and at its other end in a bore 126 on the circumference of the turntable 20. In this way the shocks on the drive shaft 18 produced by means of the worm transmission 17 are prevented from being directly transferred to the turntable which is constructed heavily to act as a flywheel, since they are evened out by the sprung rod 125. In order to limit the movement between the turntable 20 and the drive shaft, crossbar 128 is fixed on the forward end of the drive shaft 18 which bar is gripped in a slot 130 of a union 129 screwed on the turntable 20. If the relative movement between the drive shaft 18 and the turntable 20 exceeds a value represented by the width of the slot 130, the turntable 20 is directly driven by means of the crossbar 128.

I claim:
1. In an automatic record-playing apparatus, in combination, a support; magazine means on said support for removably receiving a plurality of phonograph records arrayed in parallel planes substantially along a common axis; a record-playing carriage linearly displaceable on said support along said magazine means parallel to said axis, said carriage including a turntable rotatable about an axis parallel to said axis of said magazine means and extending generally perpendicularly thereto, a clamping arm swingably mounted on said carriage and displaceable toward and away from said turntable for holding a record against the latter, a tone arm swingably mounted on said carriage for angular displacement generally transversely to the direction of displacement of said carriage and engageable with a record held against said turntable, and programming cam means rotatably mounted on said carriage and operatively coupled with said arms for sequentially displacing said arm into engagement with a record to be played; drive means for rotating said cam means; mechanical transmission means for disengageably coupling said cam means with said drive means, said transmission means having a first position wherein said cam means is connected with said drive means for rotation thereby and a second position wherein said cam means is decoupled from said drive means; means for releasably holding said transmission means in said second position; and selector means on said support for indexing said carriage in alignment with a selected one of said records and shifting said transmission means from said second position to said first position.

2. The combination according to claim 1 wherein said drive means comprises a pair of electric motors having a common shaft, said motors being arranged to rotate said shaft in opposite senses.

3. The combination according to claim 1 wherein said programming cam means comprises a tone-arm control cam for entraining said tone-arm during part of each revolution of said cam means, said cam being disengaged from said tone-arm during the remainder of each revolution whereby said tone-arm is entrained by the grooves of said record.

4. The combination according to claim 1 whereby said means for releasably holding said transmission means comprises a detent, said carriage being provided with test means engageable with said selector means and mechanically engageable with said detent for releasing same.

5. The combination according to claim 4 wherein said selector means comprises at least two rows of pins aligned in the direction of displacement of said carriage, said test means including a pair of respective pawls each aligned with one of said rows and engageable with a selected pin thereof for indexing said carriage.

6. The combination according to claim 5 wherein said pawls are swingably mounted on said carriage and are each provided with a respective feeler mechanically engageable with said selected pin whereby the pawl is swung upon such engagement to restore said pin to an inoperative position.

7. The combination according to claim 1 further comprising other transmission means disengageably connectable with said drive means for displacing said carriage, said drive means comprising a pinion, each of said transmission means including a driven gear adapted to mesh with said pinion in the operative position of each transmission means.

8. The combination according to claim 7 wherein said other transmission means comprises a lever pivotedly connected to said carriage and having a follower controlled by said cam means.

9. The combination according to claim 1 further comprising manually operable actuating means for iteratively operating said cam means for replaying a record mounted on said turntable.

10. The combination according to claim 1 wherein said clamping arm is provided with a disk rotatable about the axis of said turntable and conically converging in the direction thereof for centering a record upon said turntable.

11. The combination according to claim 10, further comprising a shifting rod secured to said tone-arm and displaceably mounted on said carriage for movement between two extreme positions upon said carriage reaching the end of its travel.

12. The combination according to claim 11, further comprising other transmission means on said carriage coupled with said drive means for displacing said carriage, said drive means including a pair of motors rotatable in opposite senses, and switch means on said carriage engageable by said shifting rod for alternately energizing said motors.

13. The combination according to claim 12, wherein each of said motors is provided with a relatively massive armature, one of said motors being de-energized upon energization of the other of said motors so that its armature acts as a flywheel.

14. The combination according to claim 1 wherein said support is provided with a table slidably received therein and provided with indicia identifying the records received in said magazine.

15. The combination according to claim 14 wherein said selector means comprises a plurality of push-buttons arrayed in rows extending in the direction of displacement of said carriage, said push-buttons each being assigned to a respective stop member for indexing said carriage.

16. The combination according to claim 1 wherein said turntable is rotatable by said drive means, said drive means including a shaft for said turntable forming a lost-motion connection therewith, and resilient means interconnecting said shaft and said turntable for exerting a progressively increasing torque upon rotation of said shaft prior to mechanical entrainment of said turntable by said shaft.

References Cited in the file of this patent

UNITED STATES PATENTS

| | | |
|---|---|---|
| 2,826,418 | Johnson | Mar. 11, 1958 |
| 2,839,305 | Andres | June 17, 1958 |
| 2,946,594 | Staar | July 26, 1960 |